Feb. 2, 1932.   L. D. SOUBIER   1,843,248
METHOD AND APPARATUS FOR CONTROLLING GRAVITY ISSUANCE OF MOLTEN GLASS
Filed April 7, 1926   8 Sheets-Sheet 1

INVENTOR
Leonard D. Soubier
BY
J. F. Rule
HIS ATTORNEY

Fig. 4.

Feb. 2, 1932.   L. D. SOUBIER   1,843,248
METHOD AND APPARATUS FOR CONTROLLING GRAVITY ISSUANCE OF MOLTEN GLASS
Filed April 7, 1926   8 Sheets-Sheet 5

Fig. 9.

INVENTOR
Leonard D. Soubier
BY
J. F. Rule
HIS ATTORNEY

Fig. 10.

Feb. 2, 1932.   L. D. SOUBIER   1,843,248
METHOD AND APPARATUS FOR CONTROLLING GRAVITY ISSUANCE OF MOLTEN GLASS
Filed April 7, 1926   8 Sheets-Sheet 7

INVENTOR
Leonard D. Soubier
BY J. F. Rule,
HIS ATTORNEY

Feb. 2, 1932.  L. D. SOUBIER  1,843,248
METHOD AND APPARATUS FOR CONTROLLING GRAVITY ISSUANCE OF MOLTEN GLASS
Filed April 7, 1926   8 Sheets-Sheet 8

INVENTOR
Leonard D. Soubier
BY
J. F. Rule,
HIS ATTORNEY

Patented Feb. 2, 1932

1,843,248

UNITED STATES PATENT OFFICE

LEONARD D. SOUBIER, OF TOLEDO, OHIO, ASSIGNOR TO OWENS-ILLINOIS GLASS COMPANY, OF TOLEDO, OHIO, A CORPORATION OF OHIO

METHOD AND APPARATUS FOR CONTROLLING GRAVITY ISSUANCE OF MOLTEN GLASS

Application filed April 7, 1926. Serial No. 100,231.

My invention comprises an improved method and apparatus for controlling gravity issuance of molten glass for the production of suspended gobs or charges, the principal objects being to maintain uniformity of temperature and density of issuing molten glass and periodically retard and control the discharge movement of glass contiguous to and through an outlet by substantially neutralizing the action of gravity in the issuance of the glass, as by the utilization of centrifugal force. The present application contains certain subject matter which is disclosed in Patent 1,626,705, granted May 3, 1927, on my copending application Serial No. 635,212, and is a continuation thereof as to such subject matter.

Ordinarily, issuance of molten glass by gravity through a submerged outlet from a feeder or other form of container, is regulated by means of an implement such as a clay plunger which is reciprocable axially with respect to the discharge orifice, such reciprocation serving to periodically apply an alternate expelling and retracting force to the issuing glass and thereby alternately augment and arrest or retard the flow of glass to and through the outlet. Such regulation, while effective within certain limits and under certain conditions, is not entirely satisfactory.

My invention comprises the application, by the rotation of an implement or implements depending into the glass, of centrifugal force to that portion of a body of molten glass in proximity to the discharge orifice of a feeder boot or the like container, the implement being so constructed and arranged, and rotated at such speed and in such a manner that it will control, by centrifugal force, the movement of the issuing glass, the stirring action of the implement also serving to maintain substantially uniform temperature throughout the glass being discharged for delivery to a forming machine. I also provide means for periodically increasing the degree of centrifugal force applied so that sufficient opposition to the gravity discharge of molten glass may be offered that will cause retardation of that portion of the glass within and in proximity to the discharge orifice, thereby allowing periodic formation of suspended gobs or charges. Further, it is intended to combine my improved flow control means with any of several types of plungers or plugs to further facilitate quick positive discharge and retraction of the molten glass in proximity to and within the discharge outlet.

Other objects will be apparent hereinafter.

In the application of the present invention as illustrated in Figs. 1 to 8 inclusive, I have shown the same associated with a conventional form of feeder boot 20 mounted between a pair of spaced upright supports 21 and formed with a submerged discharge orifice 22, which in this instance has an annular upstanding flange 23 surrounding its inlet end and intended to coact with the adjacent lower end of the flow control implement in varying the area of an annular passageway 22' to the orifice. Arranged below the discharge orifice 22, are gob severing shears 24 of conventional or preferred form, for periodically severing charges of molten glass for gravity delivery to a forming machine 25, such machine in the present disclosure being of the rotary type and receiving rotary motion from an electric motor 26 or the like prime mover by way of a pair of bevel gears 27, a vertical shaft 28, and a spur gear or pinion 29 whose teeth mesh with those of a relatively large ring gear 30, mounted adjacent the base portion of the forming machine. The rotary carriage mounts the usual forming molds 31 and other well known elements, all of which operate in synchronism with each other and with the gob severing means, and other mechanism to be described.

Figure 4:
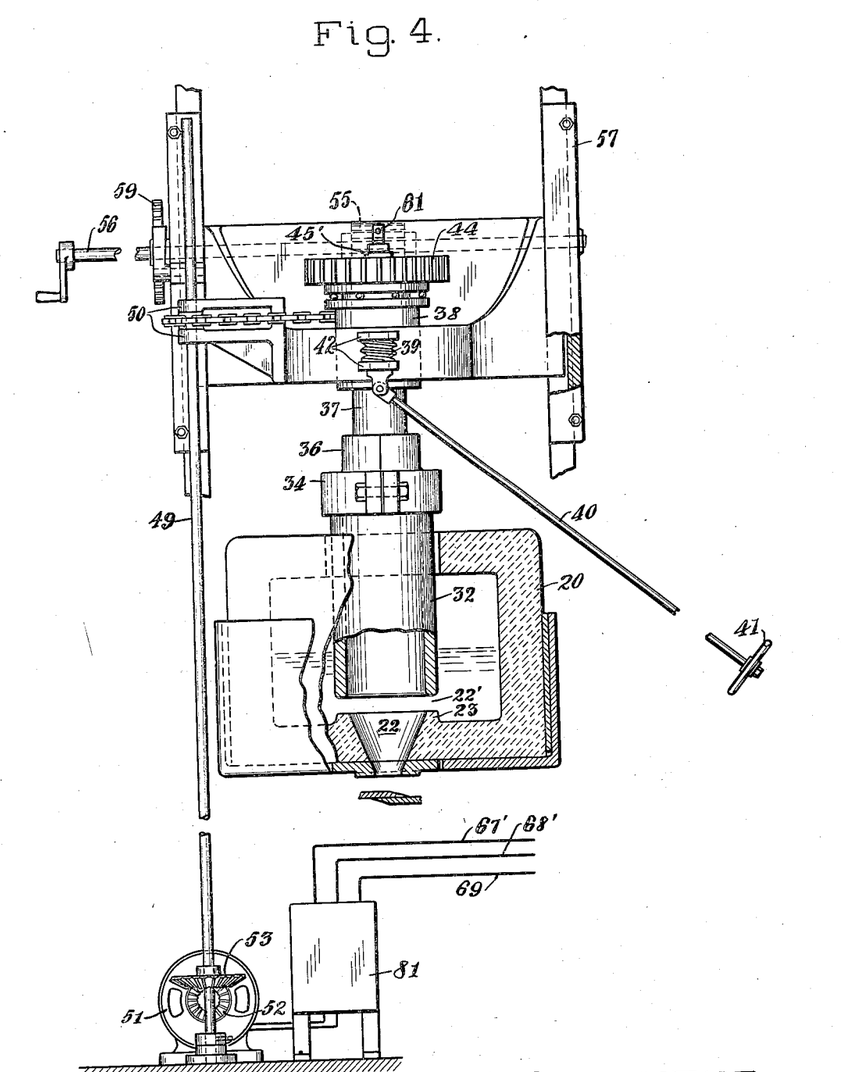
Fig. 4 is a detail front elevation with parts broken away and in section, illustrating the means for rotating and elevating the flow control implement.
Figure 5:
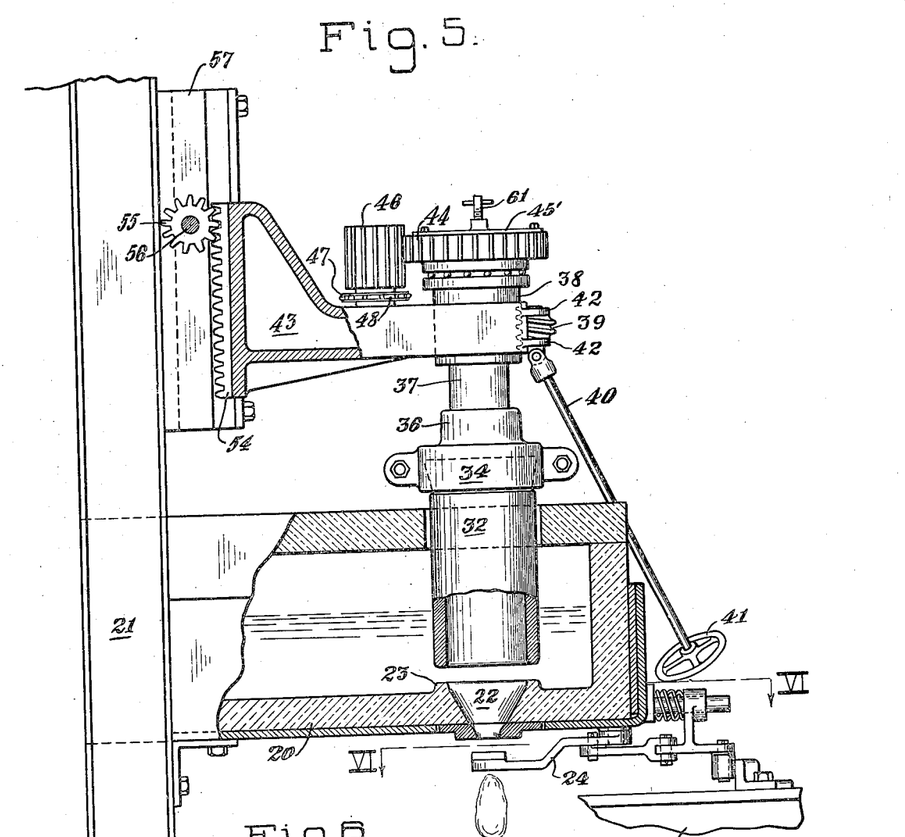
Fig. 5 is a detail elevation, partly in section, showing the means for adjusting the flow control implement and at times removing it from the boot.
Figure 6:
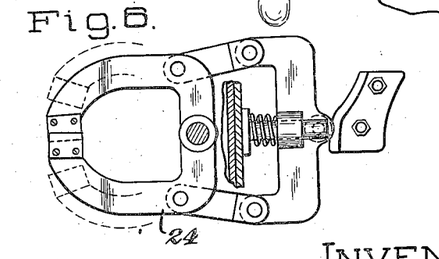
Fig. 6 is a sectional view taken substantially on the line VI—VI on Fig. 5, showing the gob or charge severing means.
Figure 7:
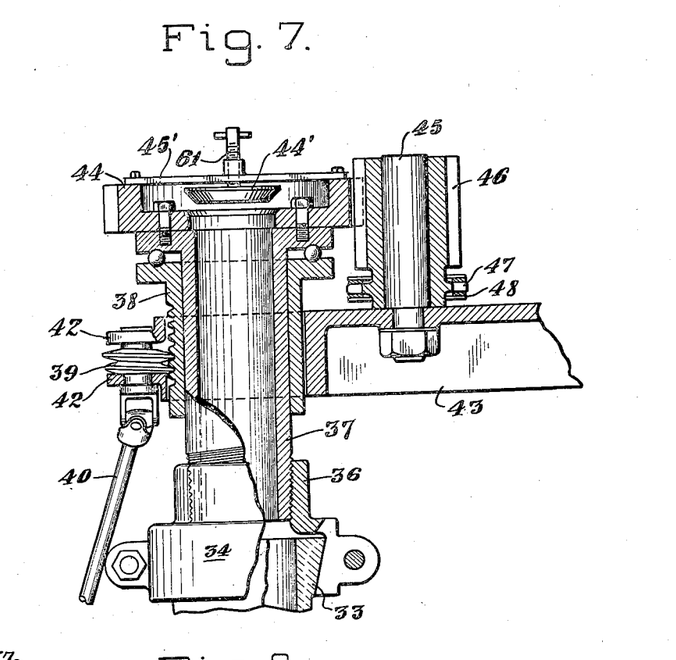
Fig. 7 is a detail sectional view illustrating the means for transmitting rotary motion to the flow control implement and other means for varying the volume of air entering the control implement.
Figure 8:
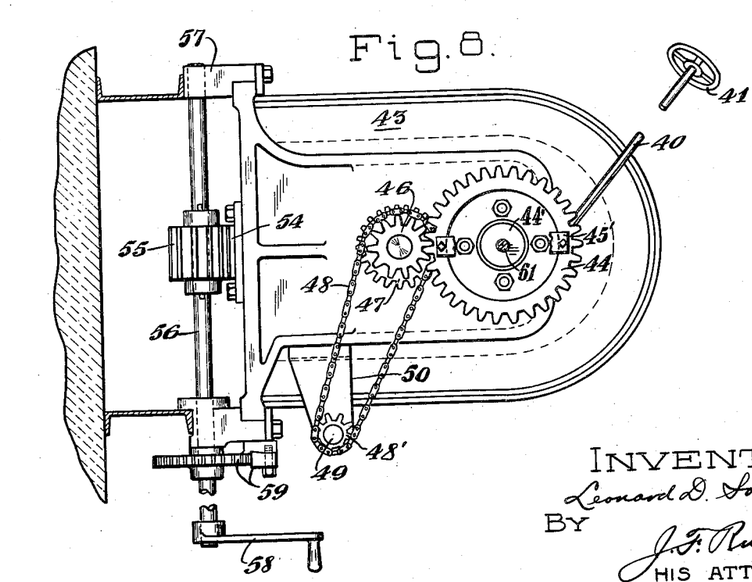
Fig. 8 is a top plan view of the portions shown in Fig. 5.
Figure 9:
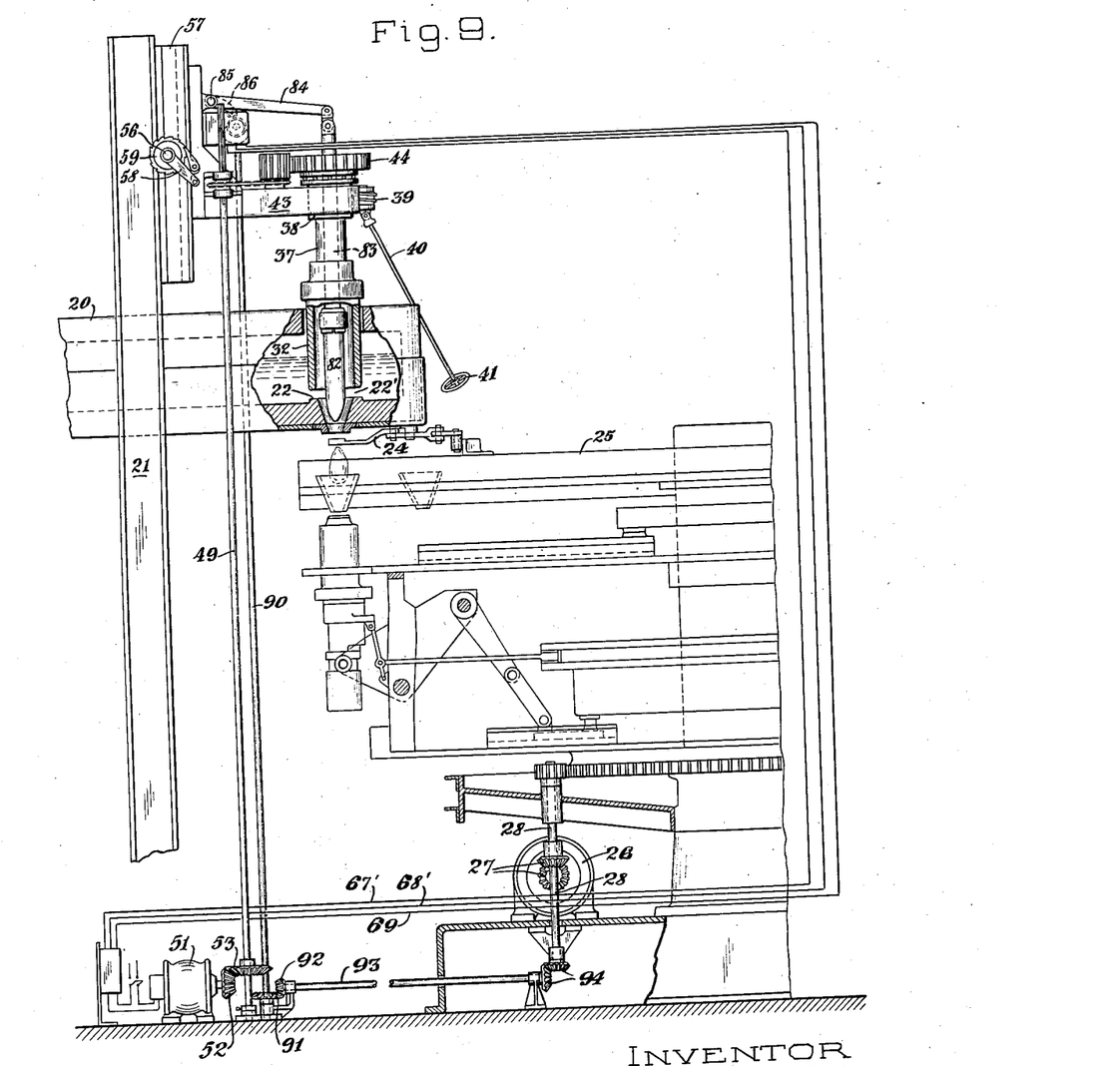
Fig. 9 is a view similar to Fig. 1, but showing a different combination wherein a reciprocable clay plunger is associated with the flow control implement.
Figure 10:
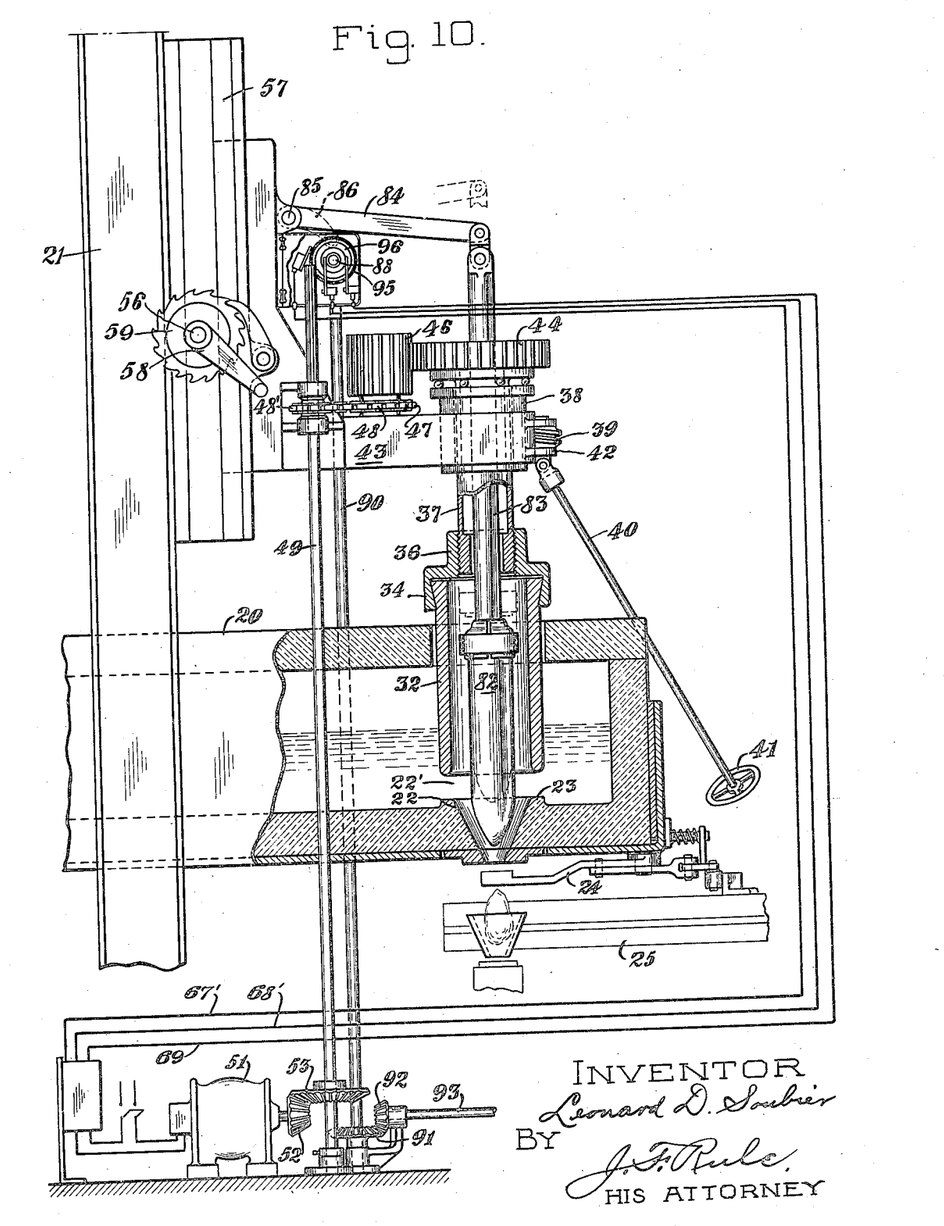
Fig. 10 is a detail elevation, partly in section, showing means for rotating and periodically increasing the rotary speed of the flow control implement and for reciprocating the plunger.
Figure 11:
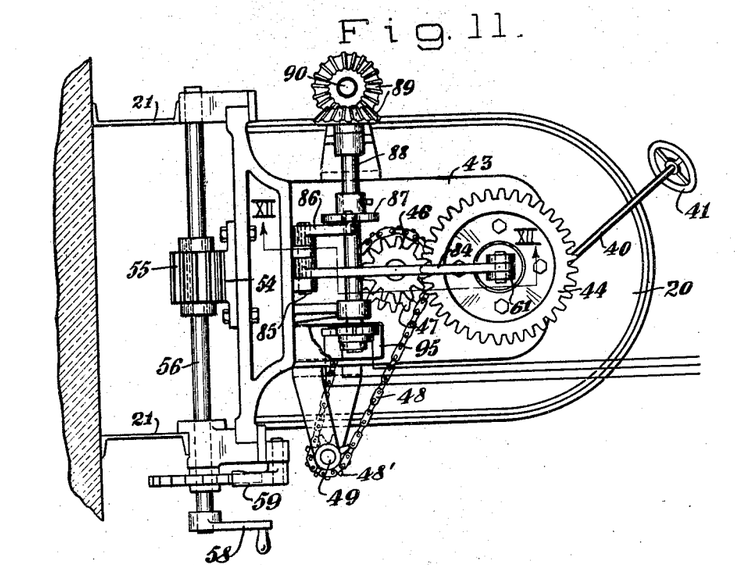
Fig. 11 is a top plan view of the structure shown in Figs. 9 and 10.
Figure 12:
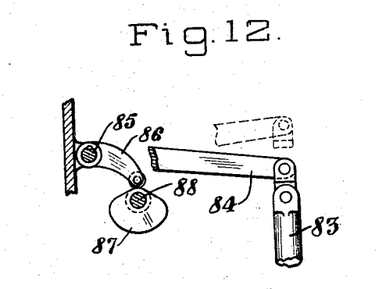
Fig. 12 illustrates the cam mechanism which effects reciprocation of the plunger.
Figure 13:
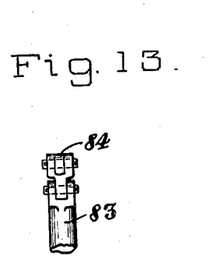
Fig. 13 is a detail view of the link connection between the upper end of the plunger carrying stem and its actuating rocker arm.

Preferably, my improved combined flow regulator and molten glass agitator includes a vertically positioned tube 32, formed of clay or other suitable material and of substantially the same diameter as the aforementioned upstanding annular flange 23. As will be noted, this tube extends upwardly through the boot cover and has an outwardly flared upper end 33 clamped in a holder 34, which has an internally threaded collar 36 (Fig. 7) rising therefrom and threaded upon the lower end of a carrying sleeve 37 whose upper end is flanged and spaced by means of bearing balls from an annular flange on a vertically adjustable bearing sleeve 38. A non-rotatable bearing sleeve 38 (Fig. 7) is vertically adjustable by rotation of a worm 39 which has driving connection with a worm gear segment on the aforementioned sleeve 38, this worm having rotary motion transmitted thereto by an adjusting rod 40 to whose lower end is affixed a hand wheel 41. This worm 39 is mounted between vertically spaced lugs 42, formed upon the forward end of a carrier bracket 43, which also serves to mount the carrying and bearing sleeves 37 and 38, respectively, in addition to a train of gears through which rotary motion is transmitted to the regulating implement 32. The gear train referred to, includes a spur gear 44 bolted to the upper end of the implement carrying sleeve 37 and having an opening communicating with the regulating tube 32 by way of the passageway through said carrying sleeve 37, as will be clear by reference to Fig. 7. Spaced inwardly from the spur gear 44, is a stub shaft 45 rising vertically from the bracket 43 and rotatably carrying a relatively long spur gear 46 adapted to drive the gear 44. The lower portion of the long gear 46 carries a sprocket wheel 47. A sprocket chain 48 is trained over the sprocket wheel 47, extends laterally from the carrier bracket 43, and is trained over a second and relatively small sprocket wheel 48' splined to and rotatable with a vertical drive shaft 49. Preferably, the last named relatively small sprocket wheel 48' is disposed between a pair of vertically spaced laterally directed arms 50, which, as shown in Figs. 4 and 8, are integral with the carrying bracket 43.

Rotation of the drive shaft 49 is attained through the use of an electric motor 51, which is provided with a bevel gear 52 whose teeth mesh with those of a bevel gear 53 keyed to the lower end of said drive shaft 49. It is obvious that with operation of the motor 51, transmission of rotary movement to the regulating implement 32 will be effected by way of the sprocket chain, bevel and spur gears mentioned.

Elevation of the carrier arm 43 and elements supported thereby is preferably effected through forming upon the inner end of this bracket, a vertical rack bar 54 whose teeth mesh with those of a pinion 55, rotatable with the shaft 56 whose ends are mounted in spaced vertical guide and supporting bars 57. Rotation of this shaft 56 and consequent elevation of the carrier bracket 43 is attained through manipulation of a crank or handle 58 fixed to one end of this shaft, and due to the arrangement of a pawl and ratchet mechanism 59 adjacent the handle 58, the bracket 43 may be set at any desired elevation. Primarily, this adjustability is provided to allow the control implement 32 to be lifted to a position above the top of the boot 20 for the ready replacement of the control implement. A finer adjustment for varying the area of the annular passageway to regulate the normal flow of glass, is attained by rotating the worm 39.

The large gear 44 is preferably formed with an annular valve seat about the wall of the opening and is adapted for coaction with an adjustable valve disk 44', which is carried by an operating or adjusting stem having threaded engagement with a supporting bar 45' whose ends are fixed to the rim portion of said gear.

When the valve disk 44' is seated, admission of air to the tube 32 is prevented and any tendency of the issuing glass to assume a hollow or tubular form is prevented. The valve may be opened whenever desired to relieve any partial vacuum which under the influence of the rotating tube may be formed within the tube. Also, adjustment of the valve to control the air pressure within the tube, facilitates the accurate control of the glass flow.

Depending from the stationary base portion 63 of the forming machine, is a bracket 64 (Figs. 1 and 2) mounting a rockable switch element 65, including a blade 66 adapted for alternate engagement with spaced contacts 67 and 68. At the fulcrum point, the switch element has electrical connection with a conductor 69 which forms one side of two alternately active circuits.

Figures 1, 2, 3:
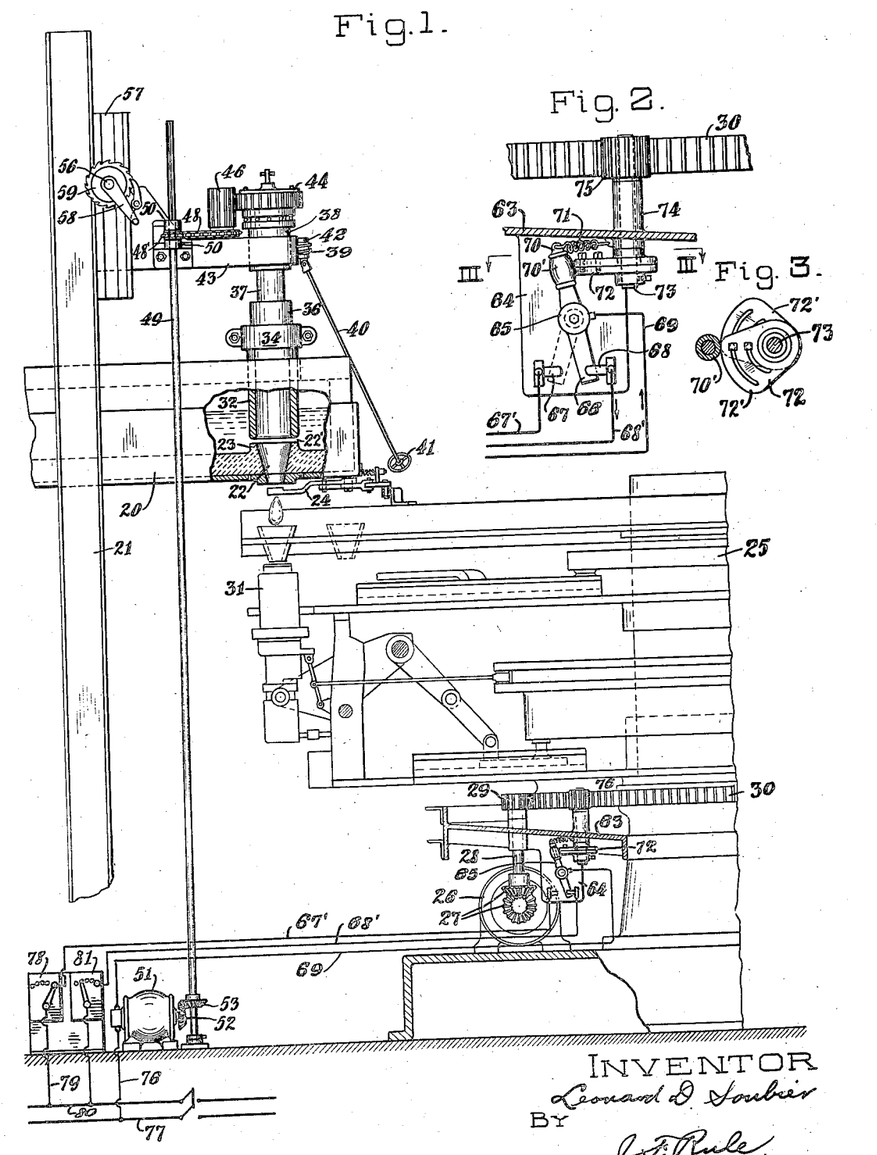
Fig. 1 is an elevation, partly in section, showing a forming machine and boot, and the manner of applying and controlling my flow regulating device thereto.
Fig. 2 is a detail view of a portion of the motor control mechanism.
Fig. 3 is a sectional view of the line III—III of Fig. 2.

A handle 70 is included in the switch element and has connection with a portion of the stationary frame 63 by means of a coil pull spring 71, and has a roller 70' adapted for contact with a cam 72 fixed to the lower end of a vertical shaft 73, which is journalled in bearings 74 as is most clearly illustrated in Fig. 2. The upper end of this shaft carries a spur gear 75 whose teeth mesh with those of the aforementioned ring gear 30, the latter serving to transmit continuous rotary motion to the spur gear 75 and said cam 72. As will be noted by reference to Fig. 3, this cam 72 is composed of two sections 72' adjustably interconnected by arcuate slot and bolt connection to permit lengthening or shortening of its active face and consequent variance of the period of slow rotation of the flow control tube 32, as circumstances may demand. One side of an electric circuit through which current is supplied to the motor 51, comprises a conductor 76 leading from one side 77 of the main supply circuit to the motor 51, and then by way of the aforementioned conductor 69 to the fulcrum point of the switch element 65. When the switch 65 is in the normal dotted line position shown in Fig. 2, current passes from the conductor 69, through the switch blade 66, contact 67, and conductor 67' to the rheostat 78, which has connection through a conductor 79 to the other side 80 of the main supply circuit. This rheostat 78 is preferably set to permit the motor 51 to operate at the maximum speed desired, by reason of which the implement 32 applies the desired degree of flow retarding centrifugal force to the glass around the outlet 22.

By reason of continuous rotation of the cam 72, the switch element will at periods be shifted to the full line position shown in Fig. 2 to cause flow of current from the conductor 69 through the switch blade 66, conductor 68', and to one side 80 of the main supply circuit by way of a second rheostat 81. This second rheostat 81 is set to decrease the motor speed a predetermined degree and consequently cause a proportionate reduction in the rotary speed of the drive shaft 49, gears rotated by the drive shaft and the flow control tube 32. This reduction in rotary speed of the tube 32 quite obviously reduces the degree of centrifugal force applied to the adjacent portions of the glass body and allows an increased flow of molten glass through the annular passageway 22' and through the discharge orifice 22.

The mode of operation may be stated as follows:

Assuming the forming machine is rotating, it is apparent that rotary motion is transmitted by the gear 75 and shaft 73 to the switch control cam 72, and that at predetermined periods the switch element is shifted to the full line position shown in Fig. 2, due to its contact with the active face of said cam. With positioning of the switch element as indicated by dotted lines in Fig. 2, the motor is permitted to rotate the flow control tube 32 at a predetermined maximum speed and thereby apply centrifugal force to the molten glass contiguous to the annular passageway and at an angle to the axis of the latter, such centrifugal force being of sufficient degree to arrest or retard glass flow through the annular passageway 22' between the adjacent ends of sleeve 32 and the aforementioned upstanding flange 23. Periodically, and in synchronism with actuation of associated elements, the switch 65 is shifted to the full line position shown in Figs. 1 and 2, thereby bringing into the then active circuit, the rheostat 81 which serves to reduce the speed of the motor and consequently correspondingly decrease the speed of rotation of the flow regulating tube 32. Obviously, reduction of the speed of rotation of this regulating tube results in lessening the degree of centrifugal force applied to the molten glass and consequently, due to the absence of a flow retarding degree of centrifugal force, allows relatively free flow through the annular passageway 22' to and through the discharge orifice 22. Under certain conditions, dependent upon the size of gob to be formed, an increase or decrease of the volume of molten glass periodically discharged through the annular passageway 22' at the lower end of the regulating tube 32, is desired, by reason of which the aforementioned worm mechanism for elevating the tube is provided. It is obvious that by rotating the hand wheel 41, vertical adjustment of the tube 32 may be attained with accuracy. Due to the adjustability of the switch control cam 72, the period of slow rotation of the flow regulating tube 32 may be lengthened or shortened as the particular circumstances require, it being clear that such variance is the direct result of changing the length of the active face of this cam. It is obvious that continuous rotation of the tube 32 will practically eliminate the presence of cold streaks in the issuing glass and consequently remove this element, which is one cause of the production of imperfect ware.

In the application of this invention as illustrated in Figs. 9 to 15, inclusive, I have shown the flow regulating tube 32 in association with a reciprocable plunger 82 which is disposed within the tube and adapted for periodic projection into the usual discharge orifice. As in the other disclosure, this combination is associated with a rotary type of forming machine 25, receiving its rotary motion from a motor 26 or the like prime mover by way of a vertical shaft 28 and suitable gears 27 and 29. Also, there is included a boot 20, having a submerged discharge orifice 22 permitting gravity issue of molten glass from which gobs are cut by a conventional type of severing means 24. As in the other application, a vertically adjustable carrier bracket 43 is disposed above the boot 20, and rotatably mounts a depending sleeve 37 to whose lower end is removably affixed a rotatable flow regulating tube 32 which projects into the molten glass and is adjustable toward and from and co-axially with the annular flange 23 around the discharge orifice 22 by rotation of an adjusting rod 40 carrying a hand wheel 41, thereby allowing variation of the area of the annular passageway 22'. This rod 40 rotates a worm 39 having direct connection with a worm gear segment on a non-rotatable carrying sleeve 38. Rotation of the regulating tube 32 is attained by a gear 44 fixed to the upper end of the tube carrying sleeve 37 and rotated by a gear 46, and a sprocket chain 48 trained over sprocket wheels 47 and 48', the latter being splined to and driven by a vertical shaft 49, whose lower end mounts a bevel gear 53 whose teeth mesh with those of a second bevel gear 52 carried by the shaft of an electric motor 51 or the like prime mover.

As in the other application of my invention, the carrier bracket 43 is provided with a vertical rack bar 54 at its inner end, the teeth of this rack bar being meshed with those of a pinion 55 fixed for rotation with and by a transverse shaft 56 whose ends are journalled in vertical guide and supporting bars 57. A handle 58 is employed to rotate the shaft 56 and elevate the bracket 43, the latter being set at any preferred elevation by pawl and ratchet mechanism 59. The guide bars 57, as is apparent in Figure 11, slidably mount the carrier bracket 43, which bracket is adjustable to allow removal of the implements from the boot.

Periodic reciprocation of the plunger 82 is effected by connecting the upper end to a vertical post or stem 83, which has link connection to the outer end of a rock arm 84 fixed at its other end to a rock shaft 85. By reference to Fig. 11, it will be noted that periodic rocking of this shaft 85 and arm 84 is attained by actuating a relatively short arm 86 whose outer end mounts a roller having contact with the periphery of a cam 87, this cam being adjustable upon and rotatable with a continuously rotating shaft 88 to which rotation is transmitted by bevel gears 89, one of which is splined to the upper end of a vertical drive shaft 90. Rotation of this vertical shaft 90 is effected by fixing to its lower end, a bevel gear 91 whose teeth mesh with those of a bevel gear 92, mounted on one end of a horizontal shaft 93, having bevel gear connection 94 to the aforementioned vertical shaft 28 driven by the forming machine 25.

Figure 14:
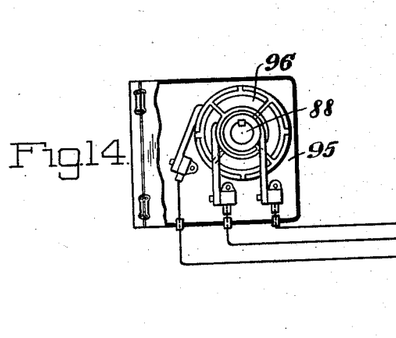
Figs. 14 and 15 are side elevational and vertical transverse sectional views, respectively, of the electric circuit controlling mechanism.
Figure 15:
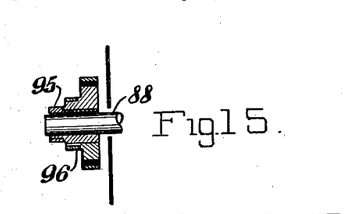

Periodic increase and decrease of the rotary speed of the flow regulating tube 32 is effected by means of a conventional form of circuit changing mechanism 95 detailed in Figs. 14 and 15. The circuit controlling element 96 is continuously rotated by reason of its being fixed to one end of the aforementioned shaft 88 supported on the carrier bracket 43, and due to such rotation the two circuits are alternately active, and since one includes greater resistance than the other, the speed of the electric motor 51 is accordingly varied. This control mechanism is of standard form and detailed description is deemed unnecessary. Obviously, such differential motor speed correspondingly and periodically affects the rotary speed of the tube 32.

Reciprocation of the plunger 82, and periodic increase and decrease of speed of rotation of the flow regulating tube 32 are so synchronized that with downward movement of the plunger 82 to apply a positive expelling force to the molten glass contained within the orifice, the speed of rotation and consequently the degree of application of centrifugal force is at its lowest stage, thereby permitting flow of molten glass to and for expulsion by the plunger 82 through the outlet. Simultaneously with initial upward movement of the plunger 82, the regulating tube 32 begins rotation at its maximum speed, resulting in application of a sufficient degree of centrifugal force to the molten glass in proximity to the discharge orifice at an angle to the axis of discharge that will retard glass flow through the annular passageway 22'. Upward movement of the plunger 82, tends to retract glass which has remained in the discharge orifice 22 and coacts with the rotary tube 32 in retarding further flow of glass to the outlet. It is apparent that through the coaction of the tube and plunger, discharge of molten glass will be arrested or retarded as desired, while in the discharge movement of glass, the plunger 82 will be quite effective in quickly applying a direct expelling force to the molten mass in the orifice and with retardation of glass flow, suspended gobs are formed and severed for delivery to blank molds.

Figures 16, 17:
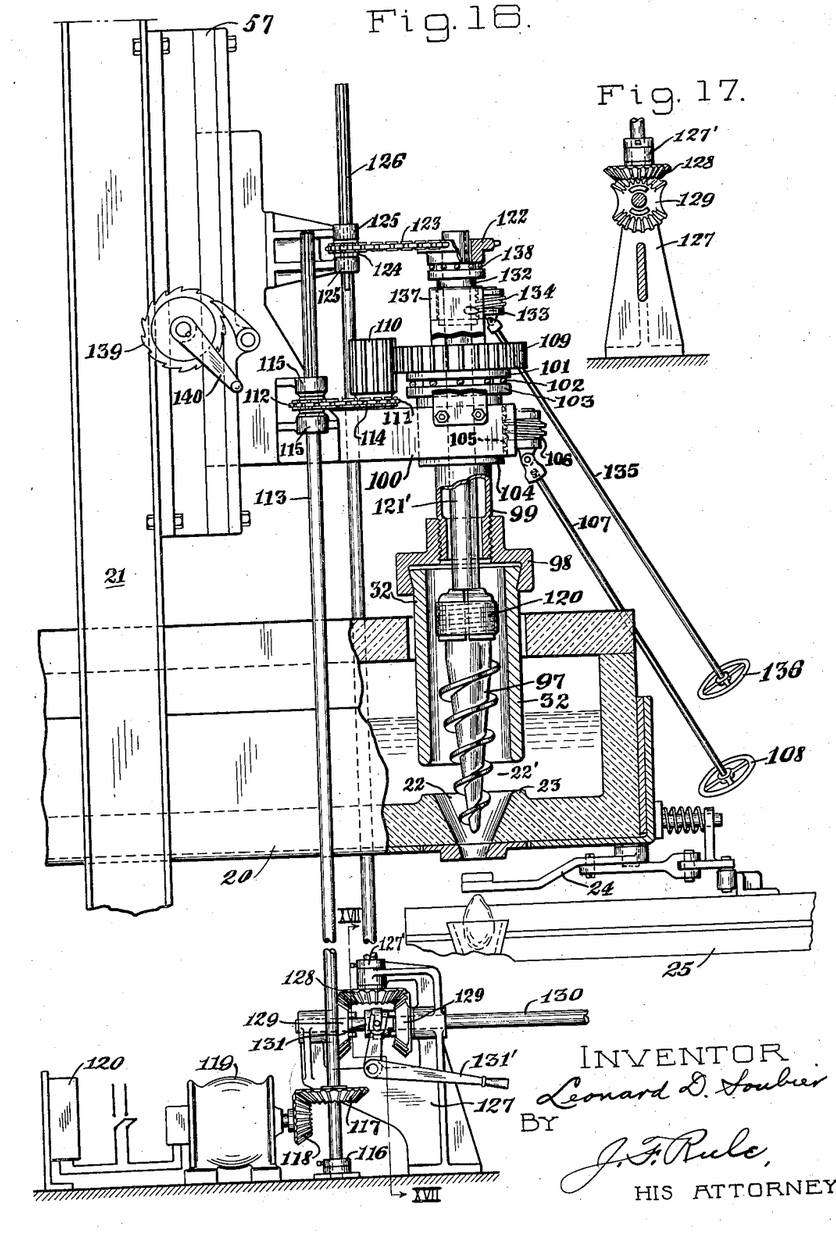
Fig. 16 is a detail elevation, partly in section, showing another application of my invention in which a rotary screw plunger is employed.
Fig. 17 is a sectional view taken substantially on the line XVII—XVII of Fig. 16.

A further application of the control tube as illustrated in Figs. 16 and 17, includes the combination with the rotatable flow regulating tube 32 of a rotary screw plug 97. In this instance, the control device is associated with a feeder boot 20, mounted between upright supports 21 and having a submerged molten glass discharge orifice 22 adapted for periodic alignment with blank molds of a rotary carriage or forming machine 25, these blank molds being adapted to receive charges or gobs of glass which have been severed from the main issuing column of molten glass by severing means 24 which operate in synchronism with the remaining mechanism. Formed around the discharge orifice 22, is an upstanding annular flange 23 which coacts with the adjacent lower end of the flow regulating tube 32 in the formation of an annular passageway 22' through which molten glass flows to the main discharge orifice 22.

The upper end of the flow regulating tube 32 is slightly enlarged and fixed in a holder 98 which has threaded engagement with a hollow stem or post 99. This stem or post 99 extends upwardly through the outer end of a carrier bracket 100, and has formed upon its upper end a radial flange 101 spaced vertically by means of bearing balls 102 from an annular radial flange 103 which is formed upon the upper end of a bearing sleeve 104 surrounding the upper portion of said stem or post 99. This last named sleeve 104 is non-rotatable and carries a worm gear segment 105 whose threads mesh with those of a worm 106 to which rotary motion is transmitted by means of an adjusting rod 107 and hand wheel 108. It is quite apparent that with rotation of the hand wheel 108, variance in the elevation and consequently the area of the annular passageway 22' to the discharge orifice 22, will be effected.

Rotary motion is transmitted to the flow regulating tube 32 at periodically varying speeds by means of a relatively large spur gear 109 fixed to the annular radial flange 101 at the upper end of the hollow stem 99, this gear 109 being rotated by a relatively small gear 110 to whose lower end is fixed a sprocket wheel 111 spaced laterally from a second sprocket wheel 112 which is splined to the upper end of a vertical shaft 113. A sprocket chain 114 is trained over the two sprocket wheels just mentioned. It will be noted that the second sprocket wheel 112 is fixed against lateral displacement by its being arranged between a pair of vertically spaced lugs 115 extending laterally from the inner end portion of the carrier bracket 100. The vertical shaft 113 has its lower end journalled in a suitable bearing 116 and mounts adjacent this end, a bevel gear 117 whose teeth mesh with those of a bevel gear 118, fixed to the shaft of an electric motor 119 or the like prime mover. A control mechanism 120 is associated with the motor 119 and operates in synchronism with the forming machine and other mechanisms to periodically vary the speed of the motor and consequently change the rotary speed of the flow regulating tube 32 at properly timed intervals.

Rotation of the screw plug 97, is attained through extending upwardly from the plug holding chuck 121, a post 121' to whose upper end is affixed a sprocket wheel 122 having trained thereover, a sprocket chain 123 which is also carried over a second sprocket wheel 124. This second sprocket wheel 124 is disposed between vertically spaced lugs 125 and splined to the plug rotating shaft 126. The lower end of this shaft 126 is journalled in a bearing 127' carried by a stand 127 and mounts below a portion of the bearing, a bevel gear 128 whose teeth mesh with those of a pair of diametrically opposed mutilated gears 129. These gears 129 are loosely mounted upon a drive shaft 130 and are adapted to periodically transmit rotary motion to the plug 97, such rotation being periodic due to the mutilated form of the gears 129.

A shiftable clutch member 131 is disposed between the mutilated gears for the purpose of reversing the direction of rotation of the plug 97 as desired, this shiftable clutch member being splined on the shaft and shiftable by a handle 131' for engagement with either of the gears 129.

Under certain conditions, it may be desirable to elevate the plug 97 with respect to the discharge orifice 22, and consequently I have arranged a non-rotatable sleeve 132 at the upper end of the post 121' and have formed upon this sleeve, a worm gear segment 133 which coacts with a worm 134 to which rotary motion is transmitted by manual operation of an adjusting rod 135 to which is fixed a hand wheel 136. It will be noted that this worm 134 and the carrying sleeve 132 are supported in spaced relation above the spur gear 109 by means of a bracket 137 whose lower ends are bolted or otherwise secured to the carrier bracket 100. A thrust bearing 138 is formed at the upper end of the plug carrying post 121' for the purpose of minimizing friction between the moving parts as is quite obvious.

At times, removal of the flow control devices from the boot 20, is necessary and in order that this end may be readily attained, I have vertically slidably mounted the inner end of the carrier bracket 100 in vertical guiding and supporting bars 57, and have also associated with this structure a pawl and ratchet mechanism 139 by which the carrier bracket may be set at any desired elevation. Vertical movement is attained through rotation of a handle or crank 140 or the like element.

In the combination of the flow regulating sleeve and screw plug just described, the sleeve is rotated at periodically increasing and decreasing speeds, and when a relatively large suspended gob or charge of molten glass is to be formed for delivery to the forming machine, the screw plug 97 is rotated in a counter-clockwise direction at the period of slow rotation of the flow regulating sleeve 32, such counter-clockwise movement of the screw plug acting to apply an expelling force on the issuing glass, thereby augmenting the comparative large flow which takes place during the slow rotation of the sleeve.

It is apparent that at the period of slow rotation of the sleeve 32, molten glass flows through the annular passageway 22' to the discharge orifice 22. Simultaneously with this flow of glass, the quick counter-clockwise rotation of the vane carrying screw plug, will tend to quickly move the glass through the discharge orifice 22. Where the glass is to be formed into relatively small charges, the clutch 131 is shifted to reverse the direction of rotation of the screw plug 97, so that during the slow period of rotation of the flow regulating sleeve 32 and passage of molten glass to the discharge orifice 22, the clockwise rotation of the plug or plunger will, to a certain degree, have a retarding action upon the flow and consequently reduce the size and weight of the gob delivered into the blank mold. Further, when the flow control tube 32 and screw plug 97 are rotating in opposite directions, it is evident that the molten glass is subjected to a kneading action such as will thoroughly mix the hot and cool portions of the glass and eliminate cool streaks from the charges of glass, which streaks are obviously highly objectionable.

Modifications of this invention may be resorted to within the spirit and scope of the appended claims.

What I claim is:

1. The method which consists in causing molten glass to flow at a predetermined rate from an outlet in a container and periodically reducing the flow to less than half said rate by centrifugal force applied to portions of the glass in the container.

2. The method which comprises causing molten glass to flow at a predetermined rate through a restricted passageway from a supply body and through an outlet, imparting relative movement to opposite walls of said passageway by which a pull is applied to the glass opposing said flow, and periodically increasing the speed of said movement sufficiently to reduce the flow to less than half said rate.

3. The method which consists in causing glass to flow from a supply body through a passageway and downward through an outlet, maintaining a continuous movement of a wall of said passageway in a direction to apply a force to the issuing glass in opposition to the force of gravity, said applied force being sufficient to substantially overcome the force of gravity and stop the flow through said outlet, and separately applying an additional force to the issuing glass.

4. The method which consists in periodically overcoming the action of gravity on molten glass at an outlet opening in a container for the glass by a continuous force of periodically varying degree applied to the glass within the container, and controlling the issuance of glass from the outlet by an additional force periodically applied to the glass within the container.

5. The method of delivering charges of molten glass from a supply body within a container having a submerged outlet, which comprises periodically neutralizing the force of gravity at the outlet by force applied to the glass within the container while maintaining an open passageway for the glass from the container to the outlet, and periodically applying an expelling force to the glass near the outlet in synchronism with neutralization of the force of gravity.

6. The method which consists in causing glass to flow from a supply body through a passageway and downward through an outlet, maintaining a movement of a wall of said passageway in a direction to apply a force to the issuing glass in opposition to the force of gravity, said applied force being periodically varied in degree and sufficient to substantially overcome the force of gravity, and periodically applying alternate expelling and retractive forces to the issuing glass.

7. The method which consists in periodically overcoming the action of gravity on molten glass at an outlet opening in a container for the glass by a continuous force of varying degree applied to the glass within the container, and controlling the issuance of glass from the outlet by alternate expelling and retracting forces applied at regular intervals to the glass within the container.

8. The method of controlling gravity issuance of molten glass through a submerged outlet which consists in periodically opposing the action of gravity by centrifugal force applied to the glass adjacent the outlet at an angle to the axis thereof in sufficient degree to overcome the action of gravity, and periodically applying a separate axially directed force to discharge glass through the outlet.

9. The method which consists in causing gravity issue of glass through a submerged outlet, applying periodically increased degrees of centrifugal force to that portion of the glass in proximity to and surrounding the outlet sufficient to periodically stop flow of glass to the latter, and periodically applying a reverse movement to portions of the glass between that to which centrifugal force is applied and the discharge end of the outlet.

10. The combination of a container having a submerged outlet through which molten glass is caused to issue by gravity, a rotatable implement co-axial with the outlet and forming with the walls of the outlet an annular passageway thereto, a forming machine, and means controlled by the forming machine for periodically rotating the implement at varying speeds to intermittently retard flow of glass through said passageway.

11. The combination of a container having a submerged outlet through which molten glass is caused to issue by gravity, mechanism for applying centrifugal force to a portion of the glass in proximity to the outlet to retard flow to said outlet, a forming machine, and means actuated by the forming machine to periodically vary the speed of the centrifugal force applying mechanism.

12. The combination of a container having a submerged outlet through which molten glass is caused to issue by gravity a rotatable implement coacting with walls of the outlet to form an annular passageway to said outlet, means for rotating the implement to apply centrifugal force to the molten glass in proximity to the passageway, a forming machine, and cam means actuated by the forming machine for periodically increasing and decreasing the speed of the means for applying centrifugal force to the glass.

13. The combination of a container having a submerged discharge orifice through which molten glass is caused to issue by gravity, a rotatable implement for applying centrifugal force to the glass in proximity to the outlet, a variable speed motor for transmitting rotary motion to the implement, a glass forming machine, and cam mechanism actuated by the machine for periodically varying the motor speed to increase and decrease the degree of centrifugal force to control glass flow.

14. The combination of a container having a submerged discharge orifice through which molten glass is caused to issue by gravity, a rotatable implement coacting with walls of the orifice to form an annular passageway, a variable speed motor for rotating said implement, a forming machine, a switch device for controlling the motor speed, and a continuously rotatable cam actuated by said forming machine to periodically actuate the switch and vary the motor speed.

15. The combination of a container having a submerged discharge orifice through which molten glass is caused to issue by gravity, a rotatable implement, coacting with walls of the orifice to form an annular passageway, a variable speed motor for rotating said implement, a forming machine, a switch device for controlling the motor speed, and a continuously rotatable cam for changing the position of said switch, said cam being adjustable to vary the relative lengths of the periods of slow and high speeds of the motor.

16. The combination of a container having a molten glass discharge outlet, means for applying centrifugal force to a portion of a body of glass in the container, means for periodically increasing and decreasing the degree of applied centrifugal force to control the flow of glass to the outlet, separate means for periodically expelling molten glass through the outlet, a forming machine, and means actuated by rotation of the forming machine for controlling the periods of application of centrifugal force and expelling means to the glass.

17. The combination of a container having a submerged molten glass outlet, means for applying periodically increased degrees of centrifugal force to a portion of the glass about the outlet to retard flow to the outlet, means for applying a positive expelling force to the glass in the outlet between the periods of retardation, and means whereby application of said forces is synchronized.

18. The combination of a container having a submerged molten glass outlet, means for applying periodically increased degrees of centrifugal force to a portion of the glass about the outlet to retard flow to the outlet, means for applying a positive expelling force to the glass in the outlet between the periods of retardation, a forming machine, and means actuated simultaneously and in synchronism with movement of the forming machine to control the periods of application of said forces to the glass.

19. The combination of a container for molten glass having a submerged outlet, an implement extending into the glass over the outlet, means for continuously rotating said implement, means operating at predetermined time intervals for reducing the speed of said implement and maintaining it at a reduced speed during predetermined time intervals, and adjusting means by which the time intervals of reduced speed may be varied.

20. The combination of a container for molten glass having a submerged outlet, an implement extending into the glass over the outlet, means for continuously rotating said implement, means operating at predetermined time intervals for reducing the speed of said implement and maintaining it at a reduced speed during predetermined time intervals, and adjusting means by which the time intervals of reduced speed may be increased or decreased without changing the time intervals between successive speed reductions.

Signed at Toledo, in the county of Lucas and State of Ohio, this 29th day of March, 1926.

LEONARD D. SOUBIER.